Nov. 16, 1965          E. JABLONSKI          3,217,691
APPARATUS FOR COATING AND DISPENSING PARTICLES
Filed July 16, 1963
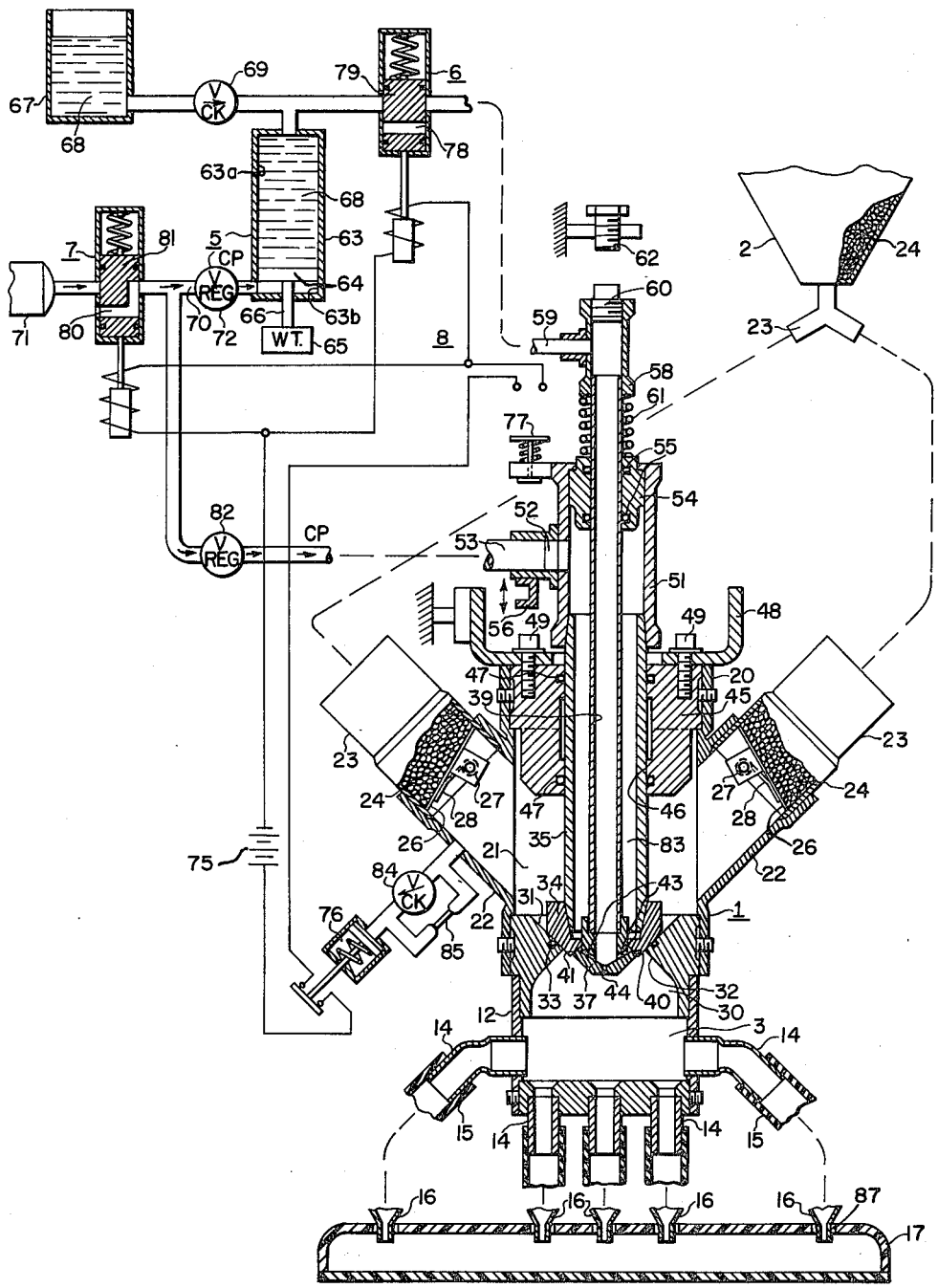
WITNESSES
Theodore F. Wrobel
James F. Young
INVENTOR
Eugene Jablonski
BY
W. F. Straitiff

United States Patent Office 3,217,691
Patented Nov. 16, 1965

3,217,691
APPARATUS FOR COATING AND DISPENSING
PARTICLES
Eugene Jablonski, Catonsville, Md., assignor to Westinghouse Electric Corporation, Pittsburgh, Pa., a corporation of Pennsylvania
Filed July 16, 1963, Ser. No. 295,395
3 Claims. (Cl. 118—303)

This invention relates generally to a novel apparatus for coating and dispensing particles, and in one specific aspect, to novel apparatus for coating expandable beads of polymeric material with a liquid to promote dielectric heatability and for the dispensing of such coated beads to a mold.

It is known to coat heat-expandable beads of polymeric material, such as polystyrene containing an expanding agent such as pentane, with water or aqueous solutions containing wetting agents to render the coated beads susceptible to being heated in a dielectric field for their expansion and molding.

It is an object of the present invention to provide an apparatus for the expeditious coating of expandable beads with a high loss factor solution and for the transporting of the coated beads to a mold.

It is still another object of the present invention to provide an apparatus for wetting expendable beads with a liquid in an expeditious manner while affording accurate control of the degree of wetting experienced by the beads.

It is still another object of the present invention to provide an apparatus for the rapid coating of expandable beads with a liquid in a manner which assures uniform over-all coating of each of such beads.

Other objects and advantages of the invention will become apparent from the following description when taken in connection with the accompanying drawing in which the single figure is a schematic showing of the novel apparatus, predominately in cross section.

Referring now to the drawing, general features of the apparatus include a bead-coating and dispensing device 1 which is constructed and arranged to cause air-venturi or suction admission of beads from a hopper of vessel 2 and their forced flow into a multi-outlet distribution chamber 3 for admittance to a mold and to spray-coat such beads with a suitable high loss factor liquid during such flow; an adjustable liquid-pressurizing means 5 for the liquid fed to the device 1 for the spray-coating of the beads; respective valve means 6 and 7 for controlling admittance of liquid and compressed, respectively, air to the device 1; and control circuit means 8 for controlling operation of the valve means 6 and 7 to effect admittance of the air and liquid to the device 1 upon a certain conditioning of same for acceptance and to terminate such admittance automatically upon creation of a mold-filled condition.

The bead-coating and distribution device 1 comprises a lower casing portion 12 which defines the distribution chamber 3 and is provided with a plurality of outlet nipples 14 to which flexible tubing 15 is connected for conveying the wetted beads from chamber 3 to a plurality of respective filler nozzles 16 when the latter are projecting into a mold 17 for the filling thereof with the wetted expandable beads prior to subjection to a high frequency field for dielectric heating and fusion of the beads together to produce a molded article of light-weight fused-together expanded beads of puffed polymeric material.

Above the lower casing portion 12 is a casing portion 20 defining a cylindrical bead-inlet chamber 21 and two oppositely-arranged bead-inlet nipples 22 each opening downwardly at about 45° into chamber 21. Both bead-inlet nipples 22 are connected via respective conduits 23 to the hopper 2 for acceptance of partially-expanded further-expandable beads 24. Each bead-inlet nipple 22 is provided with a respective butterfly valve 26 pivotal about a pin 27 and biased by a light bias spring 28 toward a closed position, in which each is shown in the drawing, and which position is assumed when pressures at opposite sides of the valve are substantially equal, inasmuch as the beads 24 are extremely light in weight.

At the junction of casing portions 12 and 20 and intermediate the bead-inlet chamber 21 and the outlet distribution chamber 3 there is a member 30 which defines a tapered annular valve seat 31 encircling a venturi throat 32 which diverges into chamber 3. The valve seat 31 includes an O-ring seal 33 for sealing contact with the lower end of a combined bead-discharge control valve and air nozzle 34 carried at the lower end of a hollow cylindrical valve stem 35 extending upwardly through chamber 21 and through casing section 20 to its exterior. At the center of the head-discharge control valve 34 there is a combined liquid spray nozzle and air discharge control valve 37, which is carried at the lower end of a hollow cylindrical valve stem 39 passing centrally upward through the valve stem 35 beyond its upper extremity. The spray-nozzle-and-air-valve 37 is provided with an annular surface 40 which seats upwardly on a complementary annular seat 41 formed in the valve 34 and has a plurality of small-diameter liquid-spray ports 43 opening upwardly from the interior of stem 39 to the annular shoulder 40 as well as a central port 44 extending vertically downward.

Affiliated with casing portion 20 at its upper end there is a closure member 45 having a central bore 46 for guiding constraint of the valve stem 35 which passes vertically therethrough and is provided with O-rings 47 for slidable fluid pressure sealing contact with the outer surface of such stem. A bracket 48 secured to the closure member 45 by machine screws 49 provides for fixed-position mounting of the casing sections 12 and 20 of the device 1.

Attached to the uppermost end of the valve stem 39 is a pipe T fitting 51 arranged to permit extension of the inner hollow valve stem 39 therethrough. A side port 52 in fitting 51 is connected to a compressed air conduit 53, and the upper end of fitting 51 is closed by a sleeve member 54 which acts to guide movement of the inner valve stem 39 and is provided with O-rings 55 in sliding fluid-pressure-sealing contact with the outer surface of such stem. Raising and lowering of the T fitting 51 and outer valve stem 35 may be effected conveniently by a vertically-movable member 56 cooperable with the bottom of a side projection of such fitting.

The upper end of the inner valve stem 39 is provided with a pipe T fitting 58 having its side boss connected to a liquid conduit 59 and its upper end closed by a plug 60. A helical compression spring 61 encircles stem 39 and abuts fitting 58 and sleeve member 54 at its opposite ends to bias inner stem 39 relative to outer stem 35 in a direction urging seating of the liquid-nozzle-and-air-valve 37 toward seat 41 in valve 34. A vertically-adjustable stop 62 is disposed above the plug 60 for abutment therewith as will be described subsequently.

The adjustable liquid-pressurizing means 5 comprises a vertically-oriented cylinder 63 having a piston 64 slidable vertically therein and biased with constant force downwardly by a weight 65 carried at the lower end of a piston rod 66. The chamber 63a of the cylinder 63 above piston 64 is open to a reservoir 67 containing the bead-coating liquid 68 by way of a check valve 69, while the chamber 63b of cylinder 63 below piston 64 is connected to a compressed air conduit 70 to be availed of compressed air from a compressed air source 71 via an adjustable constant pressure outlet regulating valve device 72 and the valve 7, or to be subject to release of such compressed air via such valve device.

The valve means 6 is a normally-closed solenoid-operated device and is simply an on-off valve which either opens or closes the liquid conduit 59 to the upper interior of cylinder 63.

The valve means 7 is a normally-vented solenoid-operated selector valve which connects the chamber 63b of cylinder 63 and the compressed air conduit 53 to device 1 either to compressed air source 71 or to the atmosphere.

The control circuit means 8 includes the windings of the solenoid valves 6 and 7, an electrical source 75, a normally-closed pressure switch 76 operated by chamber 21 pressure, a mechanical switch 77 operated by movement of fitting 51 and suitable wiring connecting the two solenoid valves in parallel with each other and in series with the source and the two switches.

Operation

In operation of the apparatus, assume initially that all components are in the respective positions in which they are shown in the drawing; that the reservoir 67 and the interior portions 63a of cylinder 63 is filled with the bead-coating liquid 68, such as dielectrically-heatable water and a wetting agent, for example; and that it is desired to fill the mold 17 with the exemplified partially-expanded further-expandable beads 24 from hopper 2.

The outer valve stem 35 is then raised by actuation of the vertically-movable member 56 through the medium of the boss on fitting 51 to first cause lifting of the bead-discharge control valve 34 from its seat 31. The valve spray nozzle 37 initially follows such movement by virtue of the lifting action of spring 61 on the upper end of the stem 39 until the plug 60 on the fitting 58 at the top of the stem 39 is carried into abutment with the adjustable stop 62, at which time, continued upward movement of the outer valve stem 35 by the member 56 causes such outer valve stem and its attached valve 34 to move upwardly a certain selected distance beyond the spray nozzle and air discharge control valve 37 which thereby becomes unseated from the downwardly facing annular seat 41 formed in valve 34. Following this the member 56 is continued to be moved upwardly until the switch 77 is closed.

Upon closure of the switch 77, parallel energizing circuits for the solenoid valves 6 and 7 are completed via the pressure switch 76, and these valves simultaneously assume positions opposite to those in which they are shown in the drawing and in which bead-coating liquid from the cylinder 63 becomes connected to the liquid conduit 59 which feeds the spray nozzle ports 43 in the spray nozzle and air discharge control valve 37 via the inner hollow valve stem 39, the fitting 58, and a port 78 in a piston valve 79 of the valve device 6 in its uppermost position, and wherein, via a port 80 in a piston valve 81 of valve device 7 in its uppermost position, compressed air from the reservoir 71 is communicated to the bottom chamber 63b beneath the piston 64 in the cylinder device 63 via the conduit 70 and the constant pressure adjustable regulating valve 72 as well as to the annular space between the inner valve stem 39 and the outer valve stem 35 in the device 1 via the fitting 51, the air conduit 53 and a constant pressure regulating valve 82.

Compressed air thus admitted to the annular space 83 between the inner valve stem 39 and the outer valve stem 35, while the bead controlling valve 34 and the combined spray nozzle and air discharge control valve 37 are unseated, causes a jet of air to emit between the valves 34 and 37 downwardly against and through the annular member 30 which creates a venturi, or sucking action in chamber 21 causing the butterfly valves to open and permit beads 24 to travel downwardly across the annular valve seat 31 into the stream of compressed air and into the distribution chamber 3. At the same time, the action of the compressed air in the chamber 63b beneath the piston 64 in the cylinder 63 will cause such piston 64 to move upwardly against the constant bias of the weight 65 and effect discharge of the bead-coating liquid 68 to the liquid-spray ports 43 in the spray nozzle and air control valve 37 via the aforedescribed flow path to cause squirting of the liquid against the annular seat 41 and against the beads 24 being transported by air into the distribution chamber 3 as above-described. A fine-mist turbulent spray condition is thus established which effectively and uniformly coats the beads while thus air-transported to the distribution chamber 3 and these liquid-coated beads, by virtue of the air pressure established in chamber 3 will cause same to flow from the distribution chamber into the mold 17 to fill same by way of a plurality of filler nozzles 16, the flexible tubing 15, and the outlet nipples 14 affiliated with lower casing portion 12 of device 1. Clearance between the filler nozzles 16 and openings 87 in the top of the mold 17 permits the air to escape from the mold 17 while the air-conveyed means are admitted thereto; the clearance being sufficiently small to prevent escape of the beads, however.

Upon filling of the mold 17 with the beads 24 coated with liquid as described above, a back pressure is established within the distribution chamber 3 and in the bead-inlet chamber 21 in the device 1 which effects opening of the pressure switch 76 and deenergization of the solenoid valves 6 and 7 and causes them to return to their respective lowermost positions in which they are shown in the drawing to terminate supply of pressurized liquid and compressed air to the device 1. Operation of the spray nozzle 37 then ceases and the flow of beads 24 into the inlet chamber 21 is terminated by closure of the butterfly valves 26 by action of the light bias springs 28 which are rendered effective in the absence of reduced pressure in chamber 21 brought about by cessation of air flow through the device. Supply of air to the pressure switch 76 from chamber 21 occurs by way of a check valve 84 which enables rapid opening of said pressure switch, while release of air from the pressure switch takes place by way of a choke 85 in bypass of the check valve 84 to effect delay in reclosing of the check valve 76 upon the reduction in chamber 21 pressure. This time delay affords sufficient time for the vertically movable actuator member 56 to be moved downwardly to permit the switch 77 to open and the valve stems 35 and 39 to again move downwardly to close valves 34 and 37 and return same to the positions in which they are shown in the drawing, before pressure switch 76 recloses.

In addition to the aforedescribed features of the invention, the constant bias afforded by the weight 65 on the piston 64 assures that the movement of piston 64 is not variably resisted and therefore the pressure of the liquid bead-coating material 68 in the cylinder 63 admitted to the spray nozzle 37 of the device 1 can be regulated accurately by the adjustable regulating valve device 72 and is dependent only on the pressure of compressed air admitted to the cylinder 63 irrespective of travel of the piston 64. This accurate control of the pressure of the liquid medium supplied to the nozzle 37 is believed to contribute significantly to the uniformity of coating experienced by the beads treated by the present apparatus and facilitates accurate regulation of the amount of coating applied to the beads. Furthermore, the weight 65 affiliated with cylinder 63 also effects return of the piston 64 to its lowermost position in which it is shown in the drawing upon termination of supply of liquid to the device 1 for bead-coating and this downward return of the piston causes the upper cylinder chamber 63a to be replenished with liquid from the reservoir 67 by way of the check valve 69 in readiness for the next mold-filling operation; it being understood that such downward movement of the piston is permitted by release of compressed air from the lower chamber 63b by way of the conduit 70, the regulating valve device 72, the port 80 in piston valve 81 of the valve device 7, and an atmospheric port in such device 7.

Regulation of pressure of compressed air supplied to the device 1 for operation thereof to convey beads to the mold and assist in the coating thereof is regulated by the valve device 82. By virtue of a separation between the pressure of the air flowing through the valve device 1 and regulation of the pressure of liquid supplied to the spray nozzle 37, control of the bead flow rate and of the water spray rate can be controlled independently and thereby more flexibly satisfy various operating conditions which may be met.

By adjusting the position of the stop 62, adjustment of the degree of unseating of the combined spray nozzle and air control valve 37 also may be employed as an additional adjustment which may be made to add to the flexibility of regulation of operation of the appartus.

While there has been shown and described an illustrative embodiment of the invention, modifications thereto may occur to those skilled in the art. It is not desired, therefore, that the invention necessarily be limited to the specific arrangements shown and described and it is intended to cover in the appended claims all modifications as fall within the true spirit and scope of the invention.

I claim as my invention:

1. Apparatus for liquid-coating expandable beads of polymeric material while in transit, comprising a vessel for storing coating liquid; means for effecting air-borne conveyance of such beads; spray nozzle means cooperable with the aforesaid means for introducing liquid spray in the path of bead travel; a vertically-arranged cylinder device having a piston exposed to a liquid chamber on one face and a pneumatic chamber on its opposite face and being weight-biased toward a repose position in the direction of said pneumatic chamber; means defining a one-way-flow-fluid communication from said vessel to said liquid chamber; means defining a fluid supply communication from said liquid chamber to said spray nozzle means; and pneumatic control valve means for controlling supply of compressed air to said pneumatic chamber to effect piston-movement-discharge of coating liquid from said liquid chamber to said spray nozzle means.

2. Apparatus as set forth in claim 1, wherein the aforesaid pneumatic control means includes a pressure regulating valve device for regulation of pneumatic force developed on said piston and thereby regulate the pressure and flow rate of liquid in said liquid chamber.

3. Apparatus as set forth in claim 2, further comprising pneumatic pressure regulating valve means controlling flow of conveying air to said means for effecting air-borne conveyance of such beads.

References Cited by the Examiner

UNITED STATES PATENTS

| | | | |
|---|---|---|---|
| 520,766 | 6/1894 | Bryce | 239—336 |
| 1,381,563 | 6/1921 | Jones | 103—52 |
| 2,319,865 | 5/1943 | James | 118—303 |
| 2,705,132 | 3/1955 | Nevills | 239—336 X |
| 2,850,421 | 9/1958 | Thompson | 239—335 X |
| 2,951,260 | 9/1960 | Harrison et al. | 18—5 |
| 2,973,740 | 3/1961 | Hopkins et al. | 118—303 |
| 3,009,926 | 11/1961 | Straughn et al. | 118—303 X |
| 3,028,625 | 4/1962 | Dawson | 18—5 |

FOREIGN PATENTS 60,839  2/1891  Germany.

DANIEL BLUM, *Primary Examiner.*

ROBERT F. WHITE, *Examiner.*